US012626350B2

(12) United States Patent
Yi et al.

(10) Patent No.: US 12,626,350 B2
(45) Date of Patent: May 12, 2026

(54) ULTRAVIOLET LIGHT AND VISIBLE LIGHT FUSION METHOD FOR DETECTING POWER DEVICE

(71) Applicant: Chongqing University, Chongqing (CN)

(72) Inventors: Yong Yi, Chongqing (CN); Yuwen Pan, Chongqing (CN); Jinqiao Du, Chongqing (CN); Fan Yang, Chongqing (CN); Zikang Yang, Chongqing (CN); Zhimin Li, Chongqing (CN); Yuhuan Li, Chongqing (CN); Xu Tan, Chongqing (CN)

(73) Assignee: Chongqing University, Chongqing (CN)

( * ) Notice: Subject to any disclaimer, the term of this patent is extended or adjusted under 35 U.S.C. 154(b) by 240 days.

(21) Appl. No.: 18/689,191

(22) PCT Filed: Apr. 27, 2023

(86) PCT No.: PCT/CN2023/091015
§ 371 (c)(1),
(2) Date: Mar. 5, 2024

(87) PCT Pub. No.: WO2024/098678
PCT Pub. Date: May 16, 2024

(65) Prior Publication Data
US 2025/0245804 A1 Jul. 31, 2025

(30) Foreign Application Priority Data
Nov. 11, 2022 (CN) .......................... 202211410753.0

(51) Int. Cl.
*G06K 9/00* (2022.01)
*G06T 5/70* (2024.01)
(Continued)

(52) U.S. Cl.
CPC .............. *G06T 7/0004* (2013.01); *G06T 5/70* (2024.01); *G06T 7/13* (2017.01); *G06T 7/136* (2017.01);
(Continued)

(58) Field of Classification Search
CPC ......... G06T 7/0004; G06T 7/136; G06T 7/13; G06T 5/70; G06T 2207/20024;
(Continued)

(56) References Cited

U.S. PATENT DOCUMENTS

| | | | |
|---|---|---|---|
| 2021/0271937 A1* | 9/2021 | Zhang | ........................ G06T 7/30 |
| 2022/0076394 A1* | 3/2022 | Wang | ..................... H04N 23/76 |
| 2022/0114712 A1* | 4/2022 | Wu | ........................... G06T 5/50 |

* cited by examiner

*Primary Examiner* — Avinash Yentrapati
(74) *Attorney, Agent, or Firm* — Alston & Bird LLP

(57) ABSTRACT

The disclosure discloses an ultraviolet light and visible light fusion method for detecting a power device, which includes steps of: obtaining a visible light image and an ultraviolet light image of a region to be detected, respectively; registering the ultraviolet light image with a pre-trained registration model to obtain a registered ultraviolet light image; decomposing the visible light image and the registered ultraviolet light image by a wavelet function; fusing low-frequency components in the ultraviolet light image and the visible light image to obtain low-frequency fused components; fusing high-frequency components in the visible light image and the ultraviolet light image to obtain high-frequency fused components; performing inverse wavelet transformation on the low-frequency fused components and the high-frequency fused components to obtain an ultraviolet light and visible light fused image. The implementation of the present disclosure can improve image registration and a fusion effect, and has good real-time performance.

7 Claims, 3 Drawing Sheets

(51) Int. Cl.

| | |
|---|---|
| *G06T 7/00* | (2017.01) |
| *G06T 7/13* | (2017.01) |
| *G06T 7/136* | (2017.01) |

(52) U.S. Cl.

CPC ............... *G06T 2207/20024* (2013.01); *G06T 2207/20064* (2013.01); *G06T 2207/20081* (2013.01); *G06T 2207/20084* (2013.01); *G06T 2207/20221* (2013.01)

(58) Field of Classification Search

CPC . G06T 2207/20064; G06T 2207/20081; G06T 2207/20084; G06T 2207/20221; G06T 5/50; G06T 7/30

See application file for complete search history.

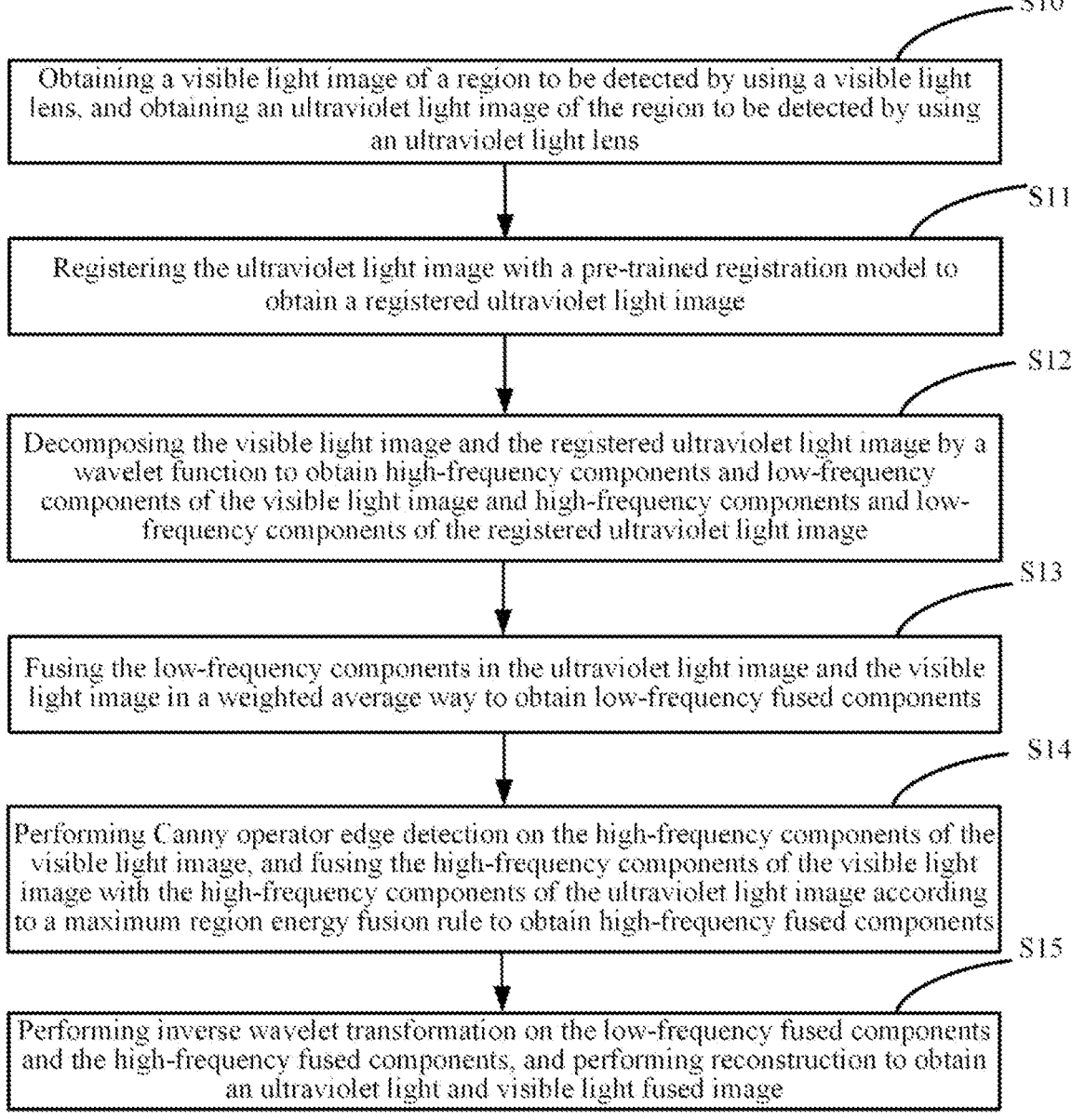

Obtaining a visible light image of a region to be detected by using a visible light lens, and obtaining an ultraviolet light image of the region to be detected by using an ultraviolet light lens — S10

Registering the ultraviolet light image with a pre-trained registration model to obtain a registered ultraviolet light image — S11

Decomposing the visible light image and the registered ultraviolet light image by a wavelet function to obtain high-frequency components and low-frequency components of the visible light image and high-frequency components and low-frequency components of the registered ultraviolet light image — S12

Fusing the low-frequency components in the ultraviolet light image and the visible light image in a weighted average way to obtain low-frequency fused components — S13

Performing Canny operator edge detection on the high-frequency components of the visible light image, and fusing the high-frequency components of the visible light image with the high-frequency components of the ultraviolet light image according to a maximum region energy fusion rule to obtain high-frequency fused components — S14

Performing inverse wavelet transformation on the low-frequency fused components and the high-frequency fused components, and performing reconstruction to obtain an ultraviolet light and visible light fused image — S15

FIG. 1

ULTRAVIOLET LIGHT AND VISIBLE LIGHT FUSION METHOD FOR DETECTING POWER DEVICE

CROSS REFERENCE TO RELATED APPLICATIONS

This patent application is a National Stage Application, filed under 35 U.S.C. § 371, of International Application No. PCT/CN2023/091015, filed Apr. 27, 2023, which international application claims priority to and the benefit of Chinese Application No. 202211410753.0, filed Nov. 11, 2022; the contents of both of which as are hereby incorporated by reference in their entireties.

BACKGROUND

Technical Field

The present disclosure relates to the technical field of power detection, in particular to an ultraviolet light and visible light fusion method for detecting a power device.

Description of Related Art

The statements in this section only provide background information related to the present disclosure and do not necessarily constitute the prior art.

Corona discharge often occurs on the surfaces of transmission lines and polluted insulators, which will be accompanied by sound, light and heat effects, bringing hidden dangers to the safe operation of a power system. Therefore, it is of great significance to accurately detect the occurrence of corona and locate the position of corona in time to save energy resources and ensure the stable operation of the power system. The ultraviolet detection technology can detect a weak discharge phenomenon of faulty lines or insulators without being close to the power device and is characteristic of being long in measuring distance, noncontact, real-time, safe and reliable, which is widely used in the routine inspection of the power device.

During the development of an ultraviolet imager, the registration and fusion technology of ultraviolet and visible light images is the key to realize the accurate location of the discharge position.

At present, the registration and fusion methods for ultraviolet and visible light images include a gray-level registration method, an image registration method based on a camera model and perspective transformation between cameras, and an image fusion algorithm based on independent component analysis (ICA). Although these algorithms have certain effects, there are still some shortcomings such as poor registration effect, serious image information loss and poor real-time performance.

BRIEF SUMMARY

The technical problem to be solved by the present disclosure is that the present disclosure provides an ultraviolet light and visible light fusion method for detecting a power device, which can improve image registration and a fusion effect, and has good real-time performance.

In order to solve the technical problems, the present disclosure provides an ultraviolet light and visible light fusion method for detecting a power device, including:

step S10: obtaining a visible light image of a region to be detected by using a visible light lens, and obtaining an ultraviolet light image of the region to be detected by using an ultraviolet light lens;

step S11: registering the ultraviolet light image with a pre-trained registration model to obtain a registered ultraviolet light image;

step S12: decomposing the visible light image and the registered ultraviolet light image by a wavelet function to obtain high-frequency components and low-frequency components of the visible light image and obtain high-frequency components and low-frequency components of the registered ultraviolet light image;

step S13: fusing the low-frequency components in the ultraviolet light image and the visible light image in a weighted average way to obtain low-frequency fused components;

step S14: performing Canny operator edge detection on the high-frequency components of the visible light image, and fusing the high-frequency components of the visible light image with the high-frequency components of the ultraviolet light image according to a maximum region energy fusion rule to obtain high-frequency fused components; and step S15: performing inverse wavelet transformation on the low-frequency fused components and the high-frequency fused components, and performing reconstruction to obtain an ultraviolet light and visible light fused image.

Preferably, the step S12 further includes:

performing wavelet decomposition on the visible light image and the registered ultraviolet light image using a DB4 wavelet basis function.

Preferably, the step S13 further includes:

fusing the low-frequency components in the ultraviolet light image and the visible light image using the following formula:

$$P_L(x, y) = c_v P_{Lv}(x, y) + c_u P_{Lu}(x, y),$$

where $P_L(x, y)$ is a low-frequency coefficient of the fused image, $P_{Lv}(x, y)$ is a low-frequency coefficient of the visible light image, $P_{Lu}(x, y)$ is a low-frequency coefficient of the ultraviolet light image, Cv is a weight of the low-frequency coefficient of the visible light image, and Cu is a weight of the low-frequency coefficient of the ultraviolet light image; the Cv and Cu are obtained by pre-calibration, and Cv<Cu.

Preferably, the step S14 further includes:

fusing the high-frequency components in the ultraviolet light image and the visible light image using the following formula:

$$P_H(x, y) = \begin{cases} P_{Hv}(x, y) & E_v(x, y) \geq E_u(x, y) \\ P_{Hu}(x, y) & E_v(x, y) < E_u(x, y) \end{cases},$$

where $P_H(x,y)$ is a high-frequency coefficient of the fused image, $P_{Hv}(x,y)$ is a high-frequency coefficient of the visible light image, $P_{Hu}(x,y)$ is a high-frequency coefficient of the ultraviolet light image, and E(x,y) denotes the region energy within 5 pixels by 5 pixels with (x,y) as the a center.

Preferably, the method further includes: step S00, pre-establishing a registration model and training, wherein the registration model is an unsupervised registration network; wherein the step S00 includes:

step S001: inputting the visible light image and the ultraviolet light image to be trained to a background region module, and extracting edge features of the visible light image and the ultraviolet light image by an edge detection algorithm, respectively, to obtain an edge feature map of the visible light image and an edge feature map of the ultraviolet light image;

step S002: inputting the edge feature map of the visible light image and the edge feature map of the ultraviolet light image into a registration network (R-Net), and obtaining a deformation field by learning from the registration network;

step S003: applying the deformation field to the edge feature map of the ultraviolet light image by using a spatial transformation to deform the edge feature map, and obtaining a deformed edge feature of the ultraviolet light image; and step S004: substituting the edge feature map of the visible light image and the deformed edge feature map of the ultraviolet light image into a loss function to obtain a registration loss value, iteratively optimizing the model by minimizing the loss value, and finally outputting a trained ultraviolet/visible light registration deformation field by the background region module.

Preferably, the step S001 further includes:

obtaining a visible light image for training by using a visible light lens, and obtaining an ultraviolet light image for training by using an ultraviolet light lens;

preprocessing the visible light image and the ultraviolet light image through a preprocessing module, including image size adjustment and information statistics; and extracting respectively the edge features of the visible light image and the ultraviolet light image which have been preprocessed by a Canny edge detection algorithm.

Preferably, the specific step of extracting the edge features of the visible light image and the ultraviolet light image which have been preprocessed by the Canny edge detection algorithm includes:

performing, by a Gaussian smoothing filter, weighted average on gray values of pixels in the visible light image and the ultraviolet light image and pixels in surrounding regions of the visible light image and the ultraviolet light image, to filter out high-frequency noise in the visible light image and the ultraviolet light image;

after image denoising, calculating gradient amplitudes in horizontal and vertical directions for pixels in the visible light image and the ultraviolet light image by a Sobel operator;

further refining edges of the visible light image and the ultraviolet light image by non-maximum suppression; and setting a large threshold and a small threshold, to determine whether a pixel is an edge point, and determining and connecting the edge points according to the gradient amplitudes to form an outline.

The embodiment of the present disclosure has the following beneficial effects.

The present disclosure provides an ultraviolet light and visible light fusion method for detecting a power device, which has a better entropy, a mean value and a standard deviation on the premise of ensuring the average gradient of the fused image by using a DB4 wavelet basis function for transformation. By setting the weights of high-frequency and low-frequency components of ultraviolet light and visible light in fusion processing, and selecting a soft threshold function for denoising, more original signals can be retained, and a smooth fused image can be obtained.

The image registration model based on edge features provided by the present disclosure can well fuse the high-frequency information and the low-frequency information in the ultraviolet and visible light images, so as to obtain the registration deformation field by learning more effectively, and realize fast rigid and non-rigid registration.

The embodiment of the present disclosure can improve the image registration and the fusion effect, and has a good real-time performance. The method provided by the present disclosure can be transplanted into an embedded system, and a better fusion effect is achieved.

BRIEF DESCRIPTION OF THE DRAWINGS

In order to explain the embodiments of the present disclosure or the technical solutions in the prior art more clearly, the drawings that need to be used in the embodiments will be briefly introduced. Obviously, the drawings in the following description are only some embodiments of the present disclosure. For those skilled in the art, other drawings can be obtained according to these drawings without creative labor.

FIG. 1 is a main flow diagram of an embodiment of an ultraviolet light and visible light fusion method for detecting a power device according to the present disclosure.

DETAILED DESCRIPTION OF THE EMBODIMENTS

The technical solutions in the embodiments of the present disclosure will be clearly and completely described with reference to the drawings in the embodiments of the present disclosure hereinafter. Obviously, the described embodiments are only some embodiments of the present disclosure, rather than all of the embodiments. Based on the embodiment of the present disclosure, all other embodiments obtained by those skilled in the art without creative labor fall within the scope of protection of the present disclosure.

In order to make the above objects, features and advantages of the present disclosure more obvious and understandable, the present disclosure will be explained in further detail with reference to the drawings and detailed description hereinafter.

Figure 2:
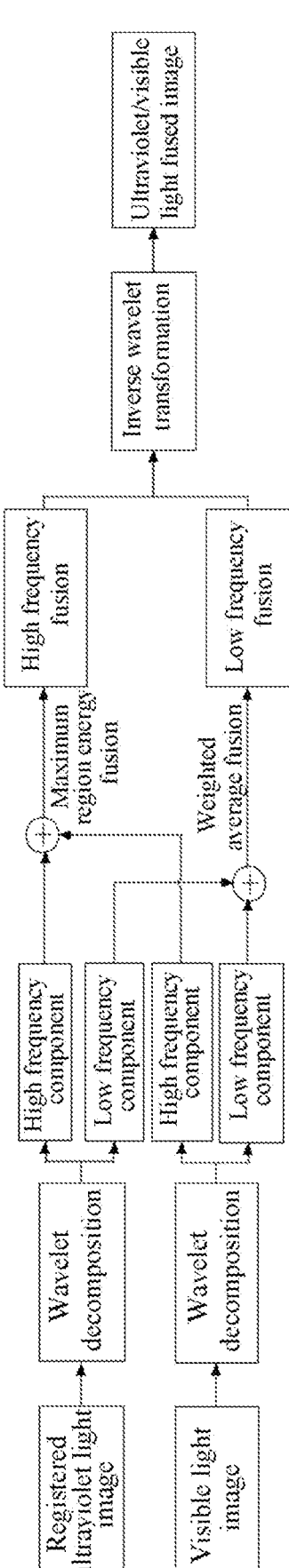
FIG. 2 is a schematic diagram of the present disclosure.
Figure 3:
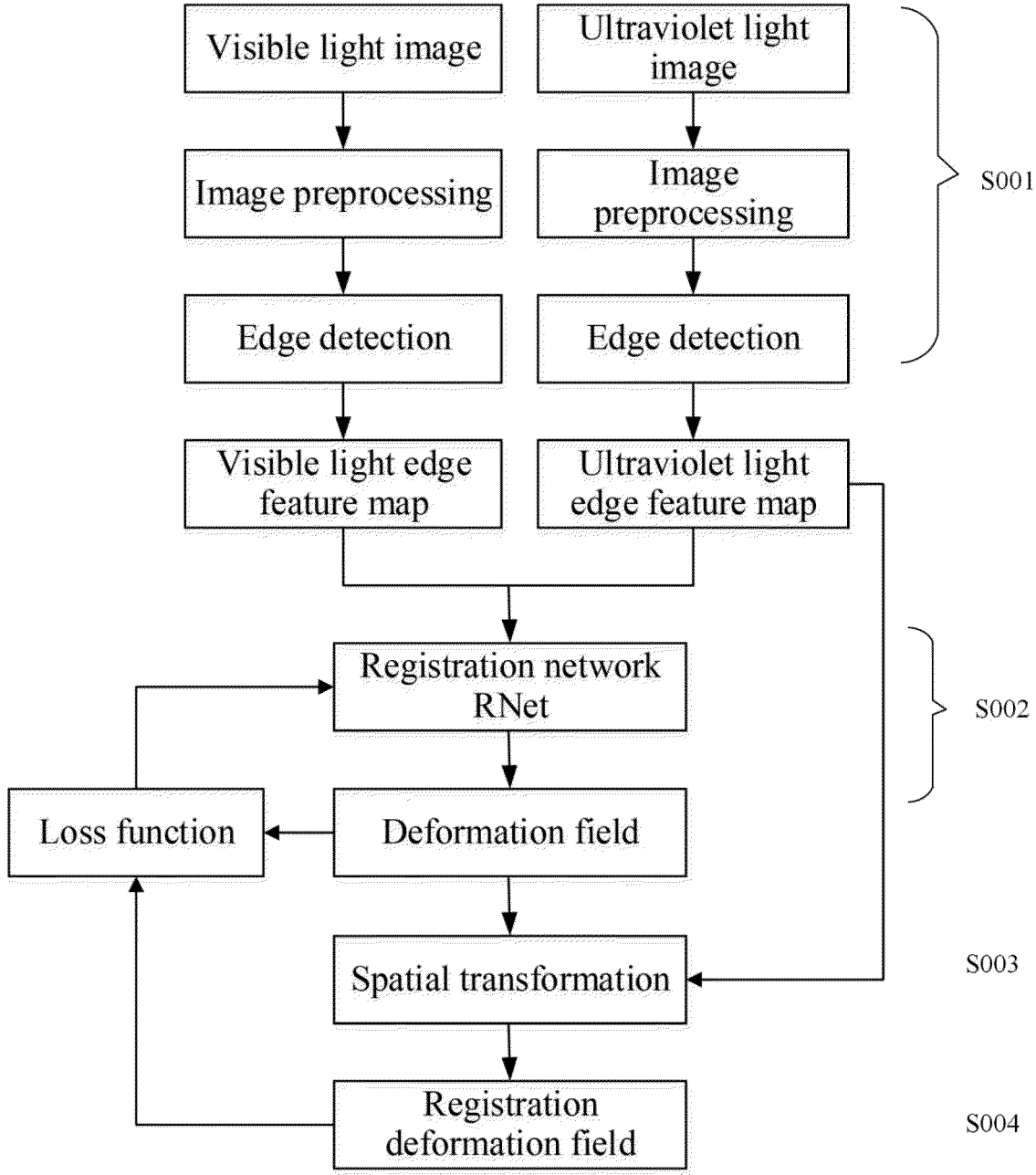
FIG. 3 is a detailed flowchart of a step of pre-establishing a registration model and training the registration model according to the present disclosure.

As shown in FIG. 1, a main flow diagram of an embodiment of an ultraviolet light and visible light fusion method for detecting a power device according to the present disclosure is shown. As shown in FIG. 2 and FIG. 3 together, in this embodiment, the method at least includes the following steps S10-S15.

In step S10, a visible light image of a region to be detected is obtained by using a visible light lens, and an ultraviolet light image of the region to be detected is obtained by using an ultraviolet light lens.

In step S11, the ultraviolet light image is registered with a pre-trained registration model to obtain a registered ultraviolet light image. The registration model is a pre-trained ultraviolet/visible light image registration model based on edge features, and its training process will be described later. The rigid and non-rigid registration between multimodal images is achieved mainly using the unsupervised registration network. The whole framework includes three functions: an edge detection, a registration network (R-Net) and a spatial transformation.

In step S12, the visible light image and the registered ultraviolet light image are decomposed by a wavelet function to obtain high-frequency components and low-frequency components of the visible light image and the registered ultraviolet light image.

It should be understood that in order to comprehensively consider the indexes such as average gradient, entropy, mean value and standard deviation, an appropriate wavelet basis function is selected. In one example, a DB4 wavelet basis function is used.

In a specific example, the step S12 further includes:

performing wavelet decomposition on the visible light image and the registered ultraviolet light image using the DB4 wavelet basis function.

In step S13, the low-frequency components in the ultraviolet light image and the visible light image are fused in a weighted average way to obtain low-frequency fused components.

In a specific example, the step S13 further includes:

fusing the low-frequency components in the ultraviolet light image and the visible light image using the following formula:

$$P_L(x, y) = c_v P_{Lv}(x, y) + c_u P_{Lu}(x, y),$$

where $P_L(x, y)$ is a low-frequency coefficient of the fused image, $P_{Lv}(x, y)$ is a low-frequency coefficient of the visible light image, $P_{Lu}(x, y)$ is a low-frequency coefficient of the ultraviolet light image, Cv is a weight of the low-frequency coefficient of the visible light image, and Cu is a weight of the low-frequency coefficient of the ultraviolet light image; the Cv and Cu are obtained by pre-calibration, and Cv<Cu.

It can be understood that in the example of the present disclosure, in order to retain the information of the ultraviolet light image as much as possible, the low-frequency components of the ultraviolet and visible light images are fused in a weighted average way. At the same time, the weights of the low-frequency components of the ultraviolet light image are set to be large, and the weights of the low-frequency components of the visible light image are set to be small.

In step S14, Canny operator edge detection is performed on the high-frequency components of the visible light image, and the high-frequency components of the visible light image are fused with the high-frequency components of the ultraviolet light image according to a maximum region energy fusion rule to obtain high-frequency fused components.

In a specific example, the step S14 further includes:

fusing the high-frequency components in the ultraviolet light image and the visible light image using the following formula:

$$P_H(x, y) = \begin{cases} P_{Hv}(x, y) & E_v(x, y) \geq E_u(x, y) \\ P_{Hu}(x, y) & E_v(x, y) < E_u(x, y) \end{cases},$$

where $P_H(x,y)$ is a high-frequency coefficient of the fused image, $P_{Hv}(x,y)$ is a high-frequency coefficient of the visible light image, $P_{Hu}(x,y)$ is a high-frequency coefficient of the ultraviolet light image, E (x,y) denotes the region energy within 5 pixels by 5 pixels with (x,y) as the center, $E_v(x,y)$ denotes the region energy of the visible light image within 5 pixels by 5 pixels with (x,y) as the center, and $E_u(x,y)$ denotes the region energy of the ultraviolet light image within 5 pixels by 5 pixels with (x,y) as the center.

In step S15, inverse wavelet transformation is performed on the low-frequency fused components and the high-frequency fused components, and reconstruction is performed to obtain an ultraviolet light and visible light fused image.

It should be understood that in the embodiment of the present disclosure, the method further includes step S00, in which a registration model is pre-established and trained. Here, the registration model is an unsupervised registration network, and the step S00 includes the following steps S001-S004.

In step S001, the visible light image and the ultraviolet light image used for training are input to a background region module, and edge features of two pictures are extracted by an edge detection algorithm, respectively, to obtain an edge feature map of the visible light image and an edge feature map of the ultraviolet light image.

Specifically, the step S001 further includes:

obtaining the visible light image for training by using a visible light lens, and obtaining the ultraviolet light image for training by using an ultraviolet light lens;

preprocessing the visible light image and the ultraviolet light image through a preprocessing module, including image size adjustment and information statistics; and respectively extracting the edge features of the visible light image and the ultraviolet light image which have been preprocessed by a Canny edge detection algorithm.

Specifically, the step of respectively extracting the edge features of the visible light image and the ultraviolet light image which have been preprocessed by a Canny edge detection algorithm specifically includes:

processing gray values of pixels in the image and pixels in its surrounding regions in a weighted average way by a Gaussian smoothing filter, to filter out high-frequency noise in the images;

after image denoising, calculating, by a Sobel operator, gradient amplitudes in horizontal and vertical directions for pixels in the images;

further refining the edges by non-maximum suppression; and setting two thresholds, namely, a large threshold and a small threshold, to judge whether a pixel is an edge point, and determining and connecting the edge points according to the gradient amplitudes to form an outline.

In step S002, the edge feature map of the visible light image and the edge feature map of the ultraviolet light image are input into a registration network (R-Net), and a deformation field is obtained by learning from the registration network.

In step S003, the deformation field is applied to the edge feature map of the ultraviolet light image by using the spatial transformation to deform the edge feature map to obtain a deformed edge feature of the ultraviolet light image.

In step S004, the edge feature map of the visible light image and the deformed edge feature map of the ultraviolet light image are substituted into a loss function to obtain a registration loss value, the model is iteratively optimized by minimizing the loss value, and a trained ultraviolet/visible light registration deformation field is finally output by the background region module.

It should be understood that, according to the image registration model based on edge features proposed by the present disclosure, the edges of the ultraviolet and visible light images are extracted through the improved Canny operator, and the edge feature map of the image to be registered is then input into a full convolution registration network R-NET designed by the present disclosure. R-NET can well fuse the high-frequency information and the low-frequency information in the ultraviolet and visible light images through jumping connection, so as to obtain the registration deformation field by learning more effectively and realize fast rigid and non-rigid registration.

The ultraviolet/visible light image fusion process based on wavelet transformation has a better entropy, a mean value and a standard deviation on the premise of ensuring the average gradient of the fused image by using a DB4 wavelet basis function for transformation. In addition, the high-frequency components after wavelet transformation are subjected to maximum suppression by setting an extreme value, which effectively removes the influence of noise. At the same time, a soft threshold function is selected for denoising, and more original signals can be retained, so as to obtain a smooth fused image.

The embodiment of the present disclosure has the following beneficial effects.

The present disclosure provides an ultraviolet light and visible light fusion method for detecting a power device, which has a better entropy, a mean value and a standard deviation on the premise of ensuring the average gradient of the fused image by using a DB4 wavelet basis function for transformation. By setting the weights of high-frequency and low-frequency components of ultraviolet light and visible light in fusion processing, selecting a soft threshold function for denoising, and retaining more original signals, a smooth fused image can be obtained.

The image registration model based on edge features provided by the present disclosure can well fuse the high-frequency information and the low-frequency information in the ultraviolet and visible light images, so as to obtain the registration deformation field by learning more effectively, and realize fast rigid and non-rigid registration.

The embodiment of the present disclosure can improve the image registration and the fusion effect and has a good real-time performance. The method provided by the present disclosure can be transplanted into an embedded system to achieve a better fusion effect.

The above is only the preferred embodiment of the present disclosure, which is not used to limit the scope of the claims of the present disclosure. Therefore, all other equivalent changes or modifications that have been completed without departing from the spirit of the present disclosure should be included in the scope of the claims of the present disclosure.

In this specification, various embodiments are described in a progressive way. The differences between each embodiment and other embodiments are highlighted, and the same and similar parts of various embodiments can be referred to each other. Since the system disclosed in the embodiment corresponds to the method disclosed in the embodiment, the system is described simply. Refer to the description of the method for the relevant points.

In the present disclosure, specific examples are applied to illustrate the principle and implementation of the present disclosure, and the explanations of the above embodiments are only used to help understand the method and core ideas of the present disclosure. At the same time, according to the idea of the present disclosure, there will be some changes in the specific implementation and application scope for those skilled in the art. To sum up, the contents of the specification should not be construed as limiting the present disclosure.

What is claimed is:

1. An ultraviolet light and visible light fusion method for detecting a power device, said method comprising the steps of:

step S10: obtaining a visible light image of a region to be detected by using a visible light lens, and obtaining an ultraviolet light image of the region to be detected by using an ultraviolet light lens;

step S11: registering the ultraviolet light image with a pre-trained registration model to obtain a registered ultraviolet light image;

step S12: decomposing the visible light image and the registered ultraviolet light image by a wavelet function to obtain high-frequency components and low-frequency components of the visible light image, and high-frequency components and low-frequency components of the registered ultraviolet light image;

step S13: fusing the low-frequency components in the ultraviolet light image and the visible light image in a weighted average way to obtain low-frequency fused components;

step S14: performing Canny operator edge detection on the high-frequency components of the visible light image, and fusing the high-frequency components of the visible light image with the high-frequency components of the ultraviolet light image according to a maximum region energy fusion rule to obtain high-frequency fused components; and step S15: performing an inverse wavelet transformation on the low-frequency fused components and the high-frequency fused components, and performing reconstruction to obtain an ultraviolet light and visible light fused image.

2. The method according to claim 1, wherein the step S12 further comprises:

performing wavelet decomposition on the visible light image and the registered ultraviolet light image using a DB4 wavelet basis function.

3. The method according to claim 2, wherein the step S13 further comprises:

fusing the low-frequency components in the ultraviolet light image and the visible light image using the following formula:

$$P_L(x, y) = c_v P_{Lv}(x, y) + c_u P_{Lu}(x, y),$$

where $P_L(x, y)$ is a low-frequency coefficient of the fused image, $P_{Lv}(x, y)$ is a low-frequency coefficient of the visible light image, $P_{Lu}(x, y)$ is a low-frequency coefficient of the ultraviolet light image, Cv is a weight of the low-frequency coefficient of the visible light image, and Cu is a weight of the low-frequency coefficient of the ultraviolet light image; the Cv and Cu are obtained by pre-calibration, and Cv<Cu.

4. The method according to claim 3, wherein the step S14 further comprises:

fusing the high-frequency components in the ultraviolet light image and the visible light image using the following formula:

$$P_H(x, y) = \begin{cases} P_{Hv}(x, y) & E_v(x, y) \geq E_u(x, y) \\ P_{Hu}(x, y) & E_v(x, y) < E_u(x, y) \end{cases},$$

where $P_H(x,y)$ is a high-frequency coefficient of a fused image, $P_{Hv}(x,y)$ is a high-frequency coefficient of the visible light image, $P_{Hu}(x,y)$ is a high-frequency coefficient of the ultraviolet light image, and $E(x,y)$ denotes region energy within 5 pixels by 5 pixels with (x,y) as a center.

5. The method according to claim 4, further comprising:

step S00: pre-establishing and training a registration model wherein the registration model is an unsupervised registration network, the step S00 comprising:

step S001: inputting the visible light image and the ultraviolet light image to be trained to a background region module, and extracting edge features of the visible light image and the ultraviolet light image by an edge detection algorithm, respectively, to obtain an edge feature map of the visible light image and an edge feature map of the ultraviolet light image;

step S002: inputting the edge feature map of the visible light image and the edge feature map of the ultraviolet light image into a registration network (R-Net), and obtaining a deformation field by learning from the registration network;

step S003: applying the deformation field to the edge feature map of the ultraviolet light image by using a spatial transformation to deform the edge feature map, and obtaining a deformed edge feature of the ultraviolet light image; and step S004: substituting the edge feature map of the visible light image and the deformed edge feature map of the ultraviolet light image into a loss function to obtain a registration loss value, iteratively optimizing the model by minimizing the loss value, and finally outputting a trained ultraviolet/visible light registration deformation field by the background region module.

6. The method according to claim 5, wherein the step S001 further comprises:

obtaining a visible light image for training by using a visible light lens, and obtaining an ultraviolet light image for training by using an ultraviolet light lens;

preprocessing the visible light image and the ultraviolet light image through a preprocessing module, the preprocessing comprising image size adjustment and information statistics; and extracting respectively the edge features of the visible light image and the ultraviolet light image which have been preprocessed by a Canny edge detection algorithm.

7. The method according to claim 6, wherein extracting the edge features of the visible light image and the ultraviolet light image which have been preprocessed by the Canny edge detection algorithm comprises:

performing, by a Gaussian smoothing filter, weighted average on gray values of pixels in the visible light image and the ultraviolet light image and pixels in surrounding regions of the visible light image and the ultraviolet light image, to filter out high-frequency noise in the visible light image and the ultraviolet light image;

after image denoising, calculating gradient amplitudes in horizontal and vertical directions for pixels in the visible light image and the ultraviolet light image by a Sobel operator;

refining edges of the visible light image and the ultraviolet light image by non-maximum suppression; and setting a large threshold and a small threshold, to determine whether a pixel is an edge point, and determining and connecting the edge points according to the gradient amplitudes to form an outline.

\* \* \* \* \*